Feb. 14, 1939.                    R. ANDRIEU                    2,147,229
                          OSCILLATION PRODUCING SYSTEM
                              Filed May 4, 1936
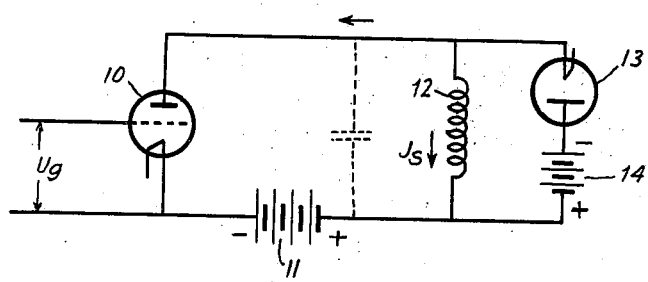
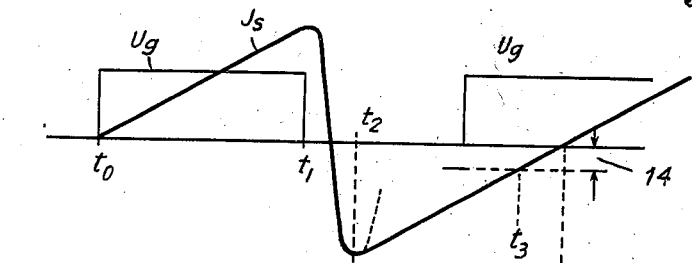
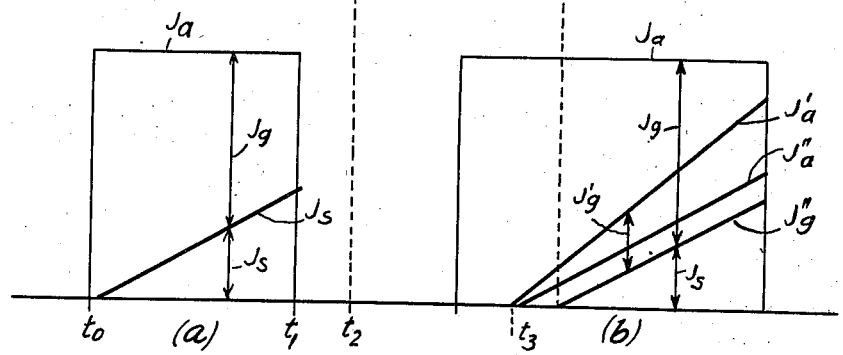
INVENTOR
ROBERT ANDRIEU Patented Feb. 14, 1939

2,147,229

UNITED STATES PATENT OFFICE 2,147,229

OSCILLATION PRODUCING SYSTEM

Robert Andrieu, Berlin, Germany, assignor to Telefunken Gesellschaft für Drahtlose Telegraphie m. b. H., Berlin, Germany, a corporation of Germany Application May 4, 1936, Serial No. 77,717
In Germany May 3, 1935

2 Claims. (Cl. 250—27)

(Granted under the provisions of sec. 14, act of March 2, 1927; 357 O. G. 5)

This invention relates broadly to a circuit arrangement adapted to the generation of a "sawtooth" or serrated wave of electrical energy, and more particularly to an arrangement whereby such a current wave of predetermined characteristics may be developed.

The object of the invention is to provide a method of operation of such a circuit wherein deflecting means for cathode ray tubes are used either in conjunction with or actually incorporated in circuit, whereby a serrated wave form of current is caused to flow in the deflecting or controlling means in a highly efficient and economical manner.

It is well known in the art to cause the deflection of cathode ray beams in the so-called "Braun" tubes by means of deflector coils, and it is also now well known in the art to take advantage of the natural electrical properties of such coils, such, for instance, as their inductance and inherent capacity in the incorporation of the coils in electrical circuits with the production of saw-tooth shaped current waves, the coils themselves being arranged to deflect the electron beam in accordance with the wave shape of the current supplied them. An example of such a use as above referred to is illustrated in my application Serial No. 61,499 filed January 30, 1936, wherein is shown an embodiment of an invention wherein the deflecting coil is connected in the output circuit of a screen grid of pentode tube, and in parallel therewith is a rectifying arrangement. The inductance and natural capacity of the coil, or other capacity, may be used to co-operate with the rectifier in producing current waves of a saw-tooth or serrated form through the coil.

My invention will best be understood by reference to the accompanying drawings in which:

Fig. 1 represents one form of circuit arrangement of the production of saw-tooth wave.

Fig. 2 is a curve illustrating the time relationship between a rectangularly shaped wave of input voltage and the current wave in the deflector coil.

Figs. 3a and 3b are a series of curves showing current relationships in the circuits of a serrated wave producing arrangement illustrating my invention.

Referring to Fig. 1, a vacuum tube 10 including input and output electrodes has connected in its plate circuit cathode ray deflecting coil 12, and in parallel thereto is connected a rectifier 13 with a battery 14 in series with said rectifier. The vacuum tube plate potential supply is furnished by means of the battery 11. The coil 12 is so chosen that its D. C. resistance is practically negligible.

Previously, there have been two types of input voltages supplied to such a circuit in order to get a saw-tooth output across the deflecting coil 12. The input voltage wave itself has been either of a saw-tooth form or a rectangular form. My application Serial No. 61,499, hereinbefore referred to, embodied the use of a somewhat similar circuit in which an input voltage wave of rectangular shape was used.

In order to illustrate the operation of such a circuit, let us suppose that a rectangularly shaped input wave is supplied to the vacuum tube 10 of Fig. 1. The results will best be understood by reference to the curves of Fig. 2. The vacuum tube 10 normally is blocked and, therefore, at the instant $t_0$ the flow of current $J_a$ through the tube, and also the flow of current $J_s$ through the coil 12 connected across the output is equal to zero. Moreover, there will be no flow of current through the rectifier 13 since the negative pole of the battery 14 is connected with the plate of the rectifier 13, as shown. If, then, the tube is opened at a time $t_0$, in accordance with the shape of the grid potential shown in Fig. 2 as $U_g$, the current $J_s$ through the inductance 12 for an instant will remain equal to zero. However, in the circuit containing tube 10, rectifier 13, battery 14 and plate battery 11, a current is caused to flow at once, seeing that the voltage of the battery 11 is essentially higher than that of the battery 14, with the result that the cathode of the rectifier 13 becomes more negative than plate. There is set up across the coil a voltage equal to that of the voltage 14 plus the drop of potential across the rectifier. If the internal resistance of the rectifier 13 be disregarded, then this voltage would be practically constant. This constant voltage across the choke coil 12 results in a linear rise of current in the choke since $$E_{12}=\frac{di_{12}}{dt}=\frac{dJ_s}{dt}=K \text{ (const)}.$$

As soon as a certain value of current $J_s$ is reached, the tube 10 will be blocked in accordance with the shape of the grid voltage $U_g$ shown in Fig. 2. There arises across the coil 12 a positive potential which also blocks the rectifier 13 so that the coil will oscillate freely, that is, at the natural vibration period of the oscillatory circuit consisting of the inductance of the coil 12 and its self-capacitance, it being understood of course that a distinct or additional capacity could be provided in parallel whenever this is deemed desirable. The current of the coil circuit 12 undergoes a free oscillation, the current extending from the positive value $J_s^{max}$ to the negative value minus $J_s^{max}$.

The voltage across the deflecting coil 12 during the time interval after the time $t_0$, $t_1$ is opposite in sense to that during the time $t_0$, $t_1$. Hence, it comprises a blocking potential for the rectifier 13. After the first half cycle has taken place, that is, from the time $t_2$, the current in the coil in so far as its sign is concerned will again be the same as in the time $t_0$, $t_1$. In other words, during the time $t_0$, $t_1$, the lower terminal of the choke coil would be positive in reference to the upper one. This voltage would be short-circuited by the rectifier 13, with the result that again there must be a linear shape or trend of the current in the choke, the slope thereof being a function of the size of the voltage 14. Now, prior to the instant $t_3$, the tube 10 is again rendered conducting so that a rise of current again takes place in the choke coil as described for the interval $t_0$, $t_1$.

There has been suggested also the use of an input voltage of a saw-tooth shape rather than the rectangularly shaped voltage $U_g$, above referred to, in order to compensate for the ohmic resistance of the choke coil 12. The suggestion previously has been to choose the amplitude of the saw-tooth voltage in such a way that the plate current $J_a$ rises more quickly than the deflecting coil current $J_s$ with the result that the fall in potential across the ohmic resistance of the choke coil, which increases with increasing current, is compensated so that a portion of current in the choke coil which is linear to a high degree will be secured.

It is, however, possible and highly desirable that the deflector coil be suitably designed so that its ohmic resistance may be entirely disregarded. Hence, the use of a saw-tooth input purely for the purposes of ohmic compensation will be unnecessary. However, there are advantages obtainable from using an input current of saw-tooth shape in view of the fact that the slope of the saw-tooth may be so selected as to control in a definite fashion the plate current of the vacuum tube 10 with respect to the current in the deflecting coil 12, and my invention is predicated on the choice of the slope of such a saw-tooth wave.

Referring to Fig. 3a, the interval $t_0$, $t_1$, shown in the figure, shows clearly the relationship between the three currents: $J_a$, which represents the plate current vacuum tube; $J_s$ which represents the current through the deflecting coil; and, $J_g$ which represents the current through the rectifier. The sum of $J_s$ and $J_g$ must be equal to $J_a$, and in the case of a rectangularly shaped input wave, the current $J_a$ will follow a rectangular pattern with respect to time.

Considering the case of an input impulse of saw-tooth or serrated form, the plate current will ordinarily be of the form shown by $J'_a$ in Fig. 3b. If the wave front is relatively steep, then $J'_a$ will have a slope which is somewhat steeper than that of the linear rise of the deflecting coil current $J_s$. As a result, the current through the rectifier may vary over a wide range as illustrated by the difference between $J'_a$ and $J_s$ in Fig. 3. The tube 10 being an amplifier tube will normally be operated on the linear portion of its characteristic. Accordingly, the plate current of tube 10 will vary in a linear fashion if the input grid signal is linear in rise, that is to say, the reproduced signal will be similar to the impressed signal. Now, as the plate current of the vacuum tube feeds into the parallel circuit comprising the inductance coil 12 and the rectifier 13, the sum of the currents through each of these branches will equal to the plate current of the tube 10. The rise in current, however, in the coil is a function of the inductance of the coil and rises in a definite linear form with respect to time as hereinbefore pointed out. As a result, the current through the rectifier at any instant will be the difference between the current in the coil at that instant and the total plate current. This is best brought out by Fig. 3b wherein $J'_a$ represents an arbitrarily selected input synchronizing pulse of linear or saw-tooth form, and $J_s$ represents the definite current through the coil. The difference between these two currents, or in order words the current through the rectifier will be $J'_g$. Now, if we impress on the grid of tube 10 a synchronizing potential of a saw-tooth form whose wave front has the same slope as the slope of the current rise through the inductance coil 12 in the output circuit of tube 10, then the plate current of tube 10 likewise will have the same slope as the current rises through the inductance coil and the rectifier current being equal to the difference between these two currents will be a constant value. This is best illustrated by reference to Fig. 3b wherein $J''_a$ represents a sawtooth wave reproduced in the output circuit of tube 10 and whose slope has been definitely selected to be the same as the current rise through the coil in the output circuit of the tube, the latter being mathematically calculable, and again, the current through the rectifier being the difference between the plate current $J''_a$ of tube 10 and the current in the coil represented by $J''_g$, this current is represented by the distance between the lines $J''_a$ and $J''_g$ which mathematically must be a constant value if the slopes of the two waves are the same. Accordingly, the plate potential source is subjected to a lower current load than in previous operations wherein a rectangular wave form is used, and also a lower load than in the case where a sawtooth wave form was used without definite selection as to its wave front steepness as regarded the deflecting coil, and a steady drain rather than a variable drain on battery 11 is obtained as well as a saving in the load on the battery. A linear voltage may be so chosen that when it is applied to the input of a vacuum tube amplifier, an output linear current may be obtained which is parallel to another linear current.

What I claim is:

1. In an electromagnetic deflection system for cathode ray tubes wherein deflection coils for deflecting the beam are energized by a direct coupled amplifier and wherein a rectifier is connected across said coil, the method of operation for producing sawtooth deflections in the cathode ray beam which comprises impressing a sawtooth wave onto the input of said amplifier of a predetermined wave front steepness such that the current through said rectifier is maintained constant.

2. In an electromagnetic deflection system for cathode ray tubes wherein deflection coils for deflecting the beam are energized by a direct coupled amplifier and wherein a biased rectifier is connected across said coil, the method of operation for producing sawtooth deflections in the cathode ray beam which comprises impressing a sawtooth wave onto the input of said amplifier of a predetermined wave front steepness such that the current through said rectifier is maintained constant.

ROBERT ANDRIEU.